(12) United States Patent
Malhotra et al.

(10) Patent No.: US 8,869,048 B2
(45) Date of Patent: Oct. 21, 2014

(54) DECLARATIVE AND MULTI-MODE WIZARD FRAMEWORK

(75) Inventors: Vipul Malhotra, Kirkland, WA (US);
Gaurav Kapila, Redmond, WA (US);
Amit Kamat, Sammamish, WA (US);
Bhavna Chauhan, Redmond, WA (US);
Bahadir Onalan, Bellevue, WA (US);
Jagadeesh Kalki, Redmond, WA (US);
Marilu Ontaneda, Redmond, WA (US);
Melissa Quintanilha, Seattle, WA (US);
Sowjanya Mudimala, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 877 days.

(21) Appl. No.: 12/941,092

(22) Filed: Nov. 8, 2010

(65) Prior Publication Data

US 2012/0117496 A1   May 10, 2012
US 2014/0040788 A9   Feb. 6, 2014

Related U.S. Application Data

(60) Provisional application No. 61/382,685, filed on Sep. 14, 2010.

(51) Int. Cl.
*G06F 3/048* (2013.01)
*G06F 9/44* (2006.01)

(52) U.S. Cl.
CPC ............. *G06F 8/38* (2013.01); *G06F 9/4443* (2013.01)
USPC .......................................... 715/762

(58) Field of Classification Search
USPC .......................................... 715/782, 788, 762
See application file for complete search history.

(56) References Cited

U.S. PATENT DOCUMENTS

| | | | |
|---|---|---|---|
| 6,957,417 B2 | 10/2005 | Turner et al. | |
| 2004/0135802 A1 | 7/2004 | Allor | |
| 2006/0228654 A1* | 10/2006 | Sanjar et al. | 430/438 |
| 2007/0277109 A1 | 11/2007 | Chen et al. | |
| 2008/0114790 A1* | 5/2008 | Hall et al. | 707/100 |

(Continued)

OTHER PUBLICATIONS

Wright, Travis, "Creating Custom Forms for Service Manager using Custom Controls: Service Request Example", Retrieved at << http://blogs.technet.com/b/servicemanager/archive/2010/01/08/creating-custom-forms-for-service-manager-using-custom-controls-service-request-example.aspx >>, Jan. 8, 2010, pp. 3.

(Continued)

*Primary Examiner* — William Bashore
*Assistant Examiner* — Jeanette J Parker
(74) *Attorney, Agent, or Firm* — Jim Sfekas; Kate Drakos; Micky Minhas

(57) ABSTRACT

A user interface mechanism may be defined by a story from which a wizard engine may create a user interface. The engine may present the story using various user interface containers that define a layout and general functions of a user interface, along with styles that may define the 'look and feel' of the user interface. The story may define an action performed once data are collected from the user. The story may also define data passed to the action, as well as the data collected from a user. The story may further define translation routines or other actions that may be launched in response to receiving user action and used to generate data that may be passed to the action.

19 Claims, 7 Drawing Sheets

(56) References Cited

U.S. PATENT DOCUMENTS

| | | | |
|---|---|---|---|
| 2009/0070291 A1* | 3/2009 | Tadayon et al. | 707/2 |
| 2011/0320425 A1* | 12/2011 | Nelson | 707/708 |
| 2012/0210209 A1* | 8/2012 | Biddle | 715/234 |

OTHER PUBLICATIONS

"Wizard Framework for WPF User Guide", Retrieved at << http://www.divelements.com/net/controls/wizardframeworkwpf/documentation/gettingstarted.htm >>, Aug. 16, 2010, pp. 4.

"Wizard Framework Overview", Retrieved at << http://www.divelements.com/net/controls/wizardframeworkwpf/ >>, Aug. 16, 2010, p. 1.

"Overview of Oracle Application Development Framework", Retrieved at << http://database.in2p3.fr/doc/oracle/Oracle_Application_Server_10_Release_3/web.1013/b28967/intro_overview001.htm >>, Aug. 13, 2010, pp. 10.

Clifton, Marc, "A Plug-in Wizard Framework", Retrieved at <<http://www.codeproject.com/KB/dialog/wizardPlugIn.aspx >>, May 21, 2008, pp. 15.

"Create an Impression", Retrieved at << http://msdn.microsoft.com/en-us/library/bb756967.aspx >>, Aug. 13, 2010, pp. 8.

"Declarative Data Binding", Retrieved at << http://dev.nexaweb.com/home/us.dev/index.html@cid=1465.html >>, Aug. 13, 2010, pp. 5.

* cited by examiner

```
                        <Wizard WizardMode="Wizard">
                          <!-- The WizardData object encapsulates all data collected by the
                        wizard/propertysheet -->
        DATA              <WizardData>
     COLLECTION          ┌<PropertyCollection>
         402─┐           │  <Property Name="Name" Type="string" />
                         │  <Property Name="Description" Type="string" />
                         └</PropertyCollection>

<!--The action represents the code executed when the OK or
                        Cancel button is clicked -->
                          <!--The Action class implements the AcceptChanges()
                        "for OK button" and RejectChanges() "for cancel button"
        ACTION          methods-->
         404─┐           ┌ <Action Assembly="MyActionsAssembly" Class="MyWizardAction" />
                        </WizardData>
                        <WizardSteps>

<!-
                        Welcome Page: uses the WizardWelcomePage template
                          -->
       SECTION          ┌<WizardStep Id="Welcome" >
         406─┐          │  <WizardWelcomePage Title="Hello World"
                        │                     Message="Demonstration Wizard"/>
                        └</WizardStep>

<!-
                        DataEntry Page: uses the generic page control to
                        autogenerate the data entry UI                           PAGE
                          -->                                                LAYOUT HINT
                         ┌  <WizardStep Id="DataEntry" >                         ┌─412
                         │    <GenericWizardPage Title="Data Entry Page">┘
                         │      <Properties>
         DATA            │        <!--Name property: demonstrates use of validation-->
         ITEM            │        <Property Name="Name">
         408─┐           ┌          <Property.Validation IsRequired="True" MinLength="1"
                        MaxLength="256" />
       SECTION           └        </Property>
         406─┐
                                  <!--Description property: demonstrates use of basic
                        layout overrides-->
         410─┐          ┌<Property Name="Description">
         DATA           │  <Property.Validation MaxLength="1024" />
         ITEM           │  <Property.LayoutOverrides Height="300" />
                        └</Property>

</Properties>
                            </GenericWizardPage>
                          </WizardStep>
                        </WizardSteps>                            ─400
                        </Wizard>                             EXAMPLE STORY
```

*FIG. 4*

DECLARATIVE AND MULTI-MODE WIZARD FRAMEWORK

Cross Reference to Related Applications

This application claims the benefit of U.S. Provisional Patent Application No. 61/382,685, entitled "Declarative Wizard Framework", filed Sep. 14, 2010, by Gaurav Kapila et al., which is incorporated herein in its entirety.

BACKGROUND

Wizards and other user interface mechanisms may collect data from a user and launch various actions. For smaller applications, such user interfaces may be individually designed and programmed As applications become larger and more complex, the sheer number of user interface mechanisms may become unwieldy to design and manage.

SUMMARY

A user interface mechanism may be defined by a story from which a wizard engine may create a user interface. The engine may present the story using various user interface containers that define a layout and general functions of a user interface, along with styles that may define the 'look and feel' of the user interface. The story may define an action performed once data are collected from the user. The story may also define data passed to the action, as well as the data collected from a user. The story may further define translation routines or other actions that may be launched in response to receiving user action and used to generate data that may be passed to the action.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings,

FIG. 4 is an example embodiment showing a story defined in XML.

DETAILED DESCRIPTION

Figure 1:
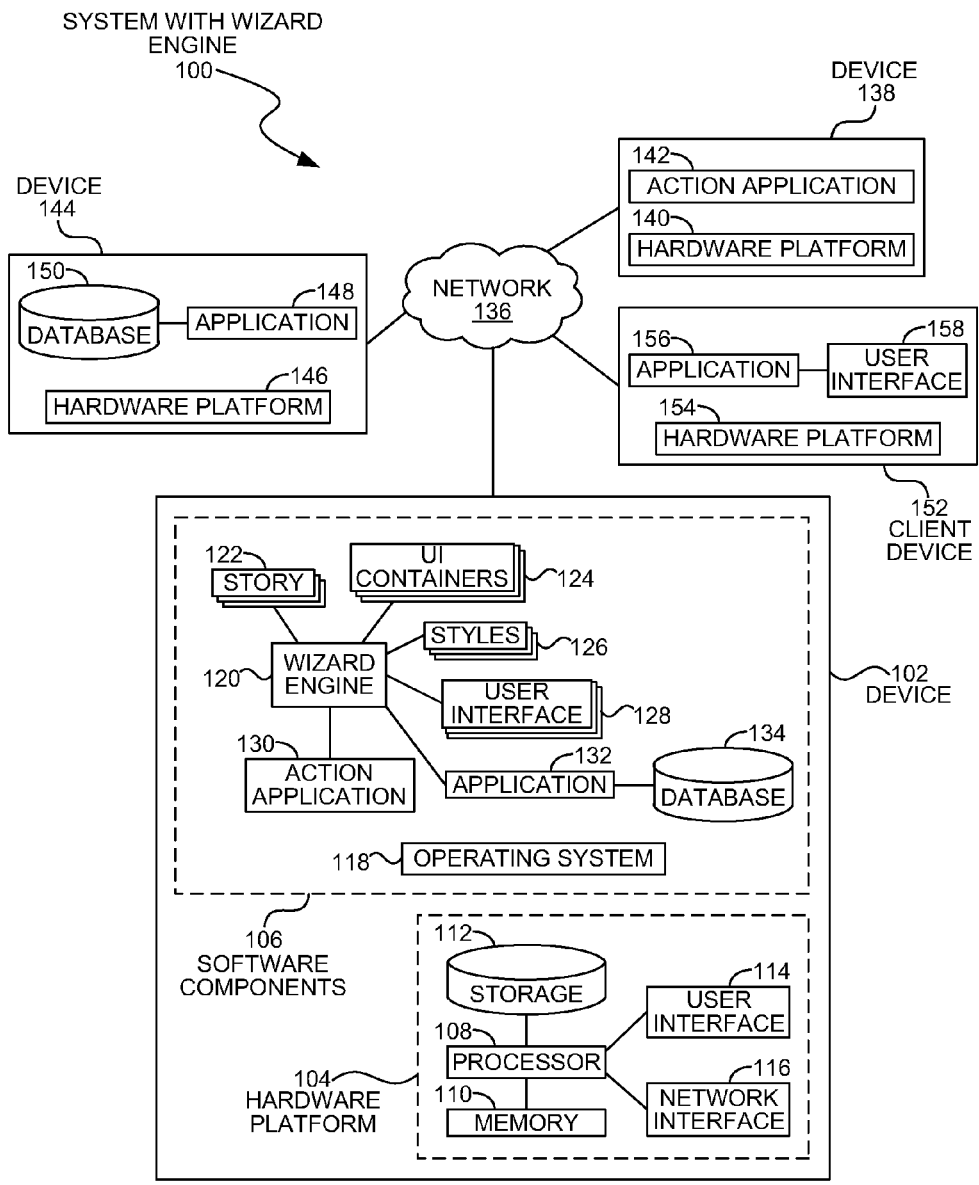
FIG. 1 is a diagram illustration of an embodiment showing a system with a wizard engine.

An interactive user interface mechanism may be defined by a story that may define an action to be performed, as well as data collected from a user. The story may be consumed by a wizard engine that may create a user interface from one of a set of user interface containers and various styles. A single story may be used to create several different user interfaces by applying a different user interface container.

The story may include definitions for an action to be performed, as well as parameters that may be passed to the action. The action may be a script, application, service, or other executable function that may accept data and perform some type of function.

The story may also include definitions of data collected from a user. The data may be defined using various types, and a wizard engine may interpret the types to create user interface components corresponding to the types. In some cases, the types may correspond with data passed to the action, while in other cases, the data collected from the user may be analyzed or processed using various routines defined in the story.

The story may be defined in a declarative manner such that a wizard engine may process the story to create a user interface. The declarative manner may simplify user interface creation as well as the maintenance and modification of user interfaces for many different types of applications.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system for creating user interfaces from various stories. Embodiment 100 is a simplified example of a hardware and software environment in which a wizard engine may use stories, user interface containers, and styles to create a user interface.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a device or network environment where a wizard engine may be deployed. The wizard engine may define user interfaces using a minimum set of information, but may allow very sophisticated and complex user interfaces to be created. In many cases, a user may interact with the user interface to review and input data, then cause an action to be performed when the conditions for the action are met, or when the user launches the action.

In a typical use scenario, a wizard engine may create a wizard-type user interface, where a user may be stepped through various user interface pages to input data or select various options. At the end of the wizard, an action may be launched, consuming the data collected from the user.

In another use scenario, a wizard engine may create a property sheet-style user interface. In such a user interface, a user may be able to navigate through various pages, which may display existing data values and give the user opportunity to view or change the value. The user may launch an action from the property sheet user interface by manually selecting a user interface button, for example.

In the examples of the wizard-type user interface and the property sheet-style user interface, the same story definition may be displayed using different user interface containers. The wizard engine may apply a different user interface story to give a different user experience, depending on the design of the application.

The wizard engine may allow a programmer to create very complex user interfaces with a minimum of programming effort and resulting in a consistent, unified 'look and feel' across multiple user interfaces. A user interface container may define the general layout and function of a user interface, and the user interface container may be reused for many different stories. A set of styles may also be defined that contain color, font, and other definitions, and the styles may be applied across multiple user interface containers.

Because the user interface containers may be reused throughout an application, a user may become comfortable with the navigation and operation of the user interfaces because of the consistency of the user interfaces. The programmer may merely create new stories rather than recreating the mechanism of the user interface.

Further, the modular design may allow updates to be performed in an economical manner. For example, a complete facelift may be performed on an application by merely updating a few user interface containers or adjusting the styles, without affecting the underlying functionality.

The user interfaces generated by a wizard engine may be defined using a declarative 'story' that may contain several elements. The story may contain an action and data collection consumed by the action. The action may be a routine, function, application, service call, application programming interface call, or any type of executable function that may consume data.

The data collection may be a set of data types that are consumed by the action. The data collection may contain mandatory and optional data that may be transmitted to the action.

The story may also contain a series of user interface sections that may be interpreted by the wizard engine and turned into user interface pages. The user interface sections may contain various data types that may be collected on each page. The sequence of user interface sections may define a sequence of pages displayed to a user in a wizard-style user interface.

The user interface sections may contain data types. The data types may be defined with a name that may or may not correspond with the data collection that may be consumed by the action. When the names of the data types correspond with the names of data consumed by the action, the wizard engine may link the two together. When the names of the data types do not correspond, a transformation operation may be defined to generate data consumed by the action from the user input.

A wizard engine may examine the data types and create a user input component corresponding with the data type. For example, a string data type may be displayed using a text box. In another example, a string data type defined with four different options may be displayed using a drop down selector that has the four options listed.

The data types may also be defined with a various layout hints. The layout hints may be used by a wizard engine to select and configure a user input component. In some cases, the layout hints may override preferences defined in a user interface container or style, while in other cases, a wizard engine may ignore some layout hints depending on the user interface container or style definitions.

For example, a layout hint for a data type with a set of options may request a set of radio buttons rather than a default drop down list user input component. In another example, a layout hint may define that a particular data type may be positioned to the upper left corner of a page, or that the data type may be presented in a bold or emphasized format.

In some cases, a data type definition may include validation information. The validation information may be as simple as defining an acceptable range of values. In more complex definitions, the validation information may include a call to an external function, application programming interface, or other service. For example, a data type for a postal code may include a function call to a remote service that may validate the data collected from the user.

The user interface may present error messages to a user when data may be invalid. The error messages may be defined as part of a user interface container or style, or may be a default configuration defined by the wizard engine. The data type definition may include configuration information that may allow a user to continue with invalid information or may prohibit the user to continue when invalid information is detected.

The wizard engine may include many default settings or selections that may be overridden by a user interface container, by the style definitions, or by the story definition. The default settings may produce a reasonable but generic user interface. In some cases, layout hint contained in the story may override settings defined in the user interface container or in the style definitions. In other cases, the layout hints may be ignored in favor of the user interface container or style definitions.

In many embodiments, different priorities may be defined for different components. When multiple components define different settings, the setting from the highest priority component may be implemented. In general, the default settings used by a wizard engine may be the lowest priority. In some embodiments, the style definitions may be the second lowest priority, with the user interface container being the next priority and layout hints being the highest priority.

In some cases, the layout hints may be disregarded in favor of a definition in a user interface container or style definition. In some cases, a layout hint may be implemented in one user interface container but not another. Such cases may be defined by specially designating certain properties in a user interface container. For example, certain portions of a user interface container may be specially designated as not able to be overridden, while the default property of user interface container definitions may be overridden by a layout hint.

Embodiment 100 illustrates a device 102 that may have a wizard engine to generate user interfaces. The device 102 may generate a user interface that may be displayed on the device 102 or on a remote device.

The device 102 is illustrated having hardware components 104 and software components 106. The controller device 102 as illustrated represents a conventional computing device, although other embodiments may have different configurations, architectures, or components.

The controller device 102 may be a server computer, desktop computer, or comparable device. In some embodiments, the controller device 102 may be a laptop computer, netbook computer, tablet or slate computer, wireless handset, cellular telephone, or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware platform 104, and may include various routines and functions that communicate directly with various hardware components.

A wizard engine 120 may execute on the device 102 as part of a larger application. The wizard engine 120 may consume various stories 122, user interface container 124, and styles 126 to generate various user interfaces 128. Each user interface 128 may have an associated action application 130 that may be launched from the user interface 128 and may consume data collected by the user interface 128.

The wizard engine 120 may be part of or called by an application 132. The application 132 may be any type of application for which a user may view and enter data. As an example, the application 132 may be a network management application where an administrator may configure and monitor devices across a network. In such an application, an administrator may launch various actions that may configure devices, add and remove services, and perform various administrative tasks. For each function performed by the application, a user interface may be generated that collects data from a user and launches an action.

The story 122 may define an action to perform, a data collection that may be transmitted to the action, and a series of user interface sections that may include data types that are collected in each user interface section. The wizard engine 120 may combine the story 122 with one of several user interface containers 124 to create a user interface 128. The styles 126 may be applied to give the user interface 128 a specific look and feel. An example of a story and resulting user interfaces may be found later in this specification.

The architecture of the components may vary with different embodiments. In some embodiments, the wizard engine 120 may be a standalone application or service that may receive a story 122, user interface container 124, and style 126 from an application 132. In another embodiment, the wizard engine 120 may be a set of functions or routines that are incorporated into the executable code of the application 132. In still another embodiment, the wizard engine 120 may be a dynamic linked library, assembly, or other group of routines that may be called by the application 132.

In some embodiments, the application 132 may have a database 134 that may supply and store some of the information processed by a user interface. In some cases, a story may define certain data items that may be displayed in the user interface. Such items may be retrieved from the database 134 prior to displaying the items, and the data collected from the user may be stored in the database 134 after collection.

The action application 130 may be any routine or function called from a user interface. In some cases, the action application 130 may be a standalone application. In other cases, the action application 130 may be a service, operating system function, or other executable within the device 102. In some cases, the action application may be a remote application or executable located on a device 138 accessed over a network 136. In a typical use, the action application 130 may be a routine within the application 132.

The device 138 may be any type of device on which a callable application, service, function, or other callable entity may reside. The device 138 may have a hardware platform 140 which may be similar to the hardware platform 104 of device 102. The device 138 may be accessed from the device 102 over a network 136, which may be any type of communications network, such as a wired or wireless local area network, wide area network, or other network.

In some embodiments, the wizard engine 120 may be located on a client device while the application that called the wizard engine 120 may reside on a server or other remote device. For example, a remote device 144 may have a hardware platform 146, which may be similar to the hardware platform 104, and may also have an application 148 and database 150. The application 148 may call the wizard engine 120 on the device 102, where the device 102 may be the user's local device.

In such an embodiment, the application 148 may transmit a story 122, user interface container 124, and styles 126 to the device 102, and the locally operable wizard engine 120 may create a user interface 128 for display on the device 102. In such an embodiment, the computing power of the device 102 may be used for creating and operating the user interface, which may offload such functions from the remote device 144.

In another architecture, the device 102 may create user interfaces that are displayed on another device. For example, the wizard engine 120 may create a user interface 128 that may be displayed on a client device 152. In such an embodiment, the device 102 may operate as a server and the device 152 may operate as a client.

The client device 152 may include a hardware platform 154 and a locally running application 156 which may display a user interface 158 that may be generated by the wizard engine 120. In one example, the user interface 128 generated by the wizard engine 120 may be defined using a Hyper Text Markup Language (HTML) description. In such an example, the application 156 may be a web browser that may display the HTML user interface description as a local user interface 158.

In another embodiment, the user interface 158 on the device 152 may connect to the device 102 using a remote desktop or remote display application. In such an embodiment, the application 156 may provide a real time connection to the device 102 and the user interfaced 128 generated on the device 102 may be displayed as the user interface 158 on a remote client device 152.

Figure 2:
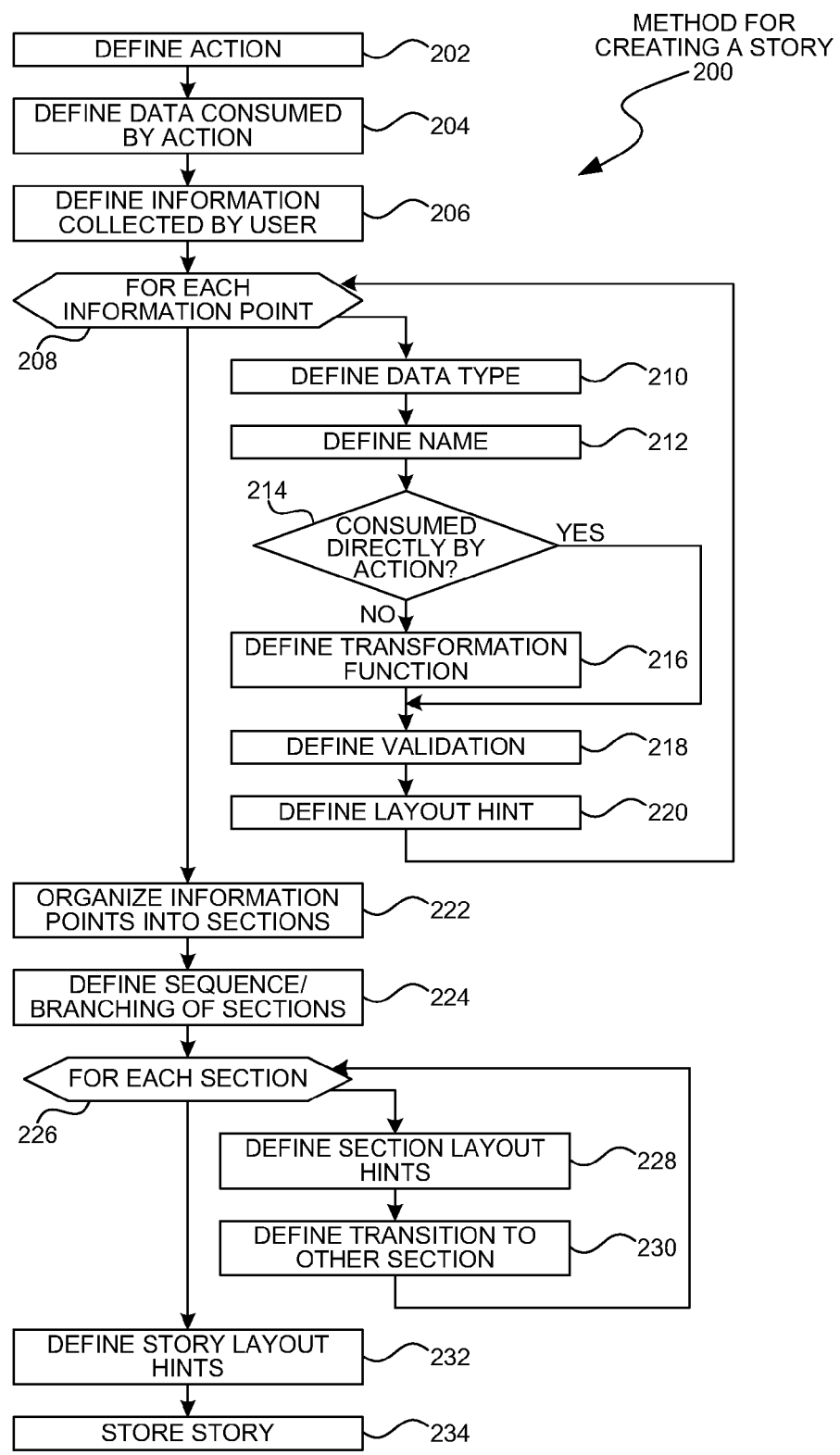
FIG. 2 is a flowchart illustration of an embodiment showing a method for creating a story.

FIG. 2 is a flowchart illustration of an embodiment 200 showing a method for creating a story. The process of embodiment 200 is a simplified example of how a programmer may define a story from which a wizard engine may create a user interface.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is a simplified example of the steps a programmer may perform to create a story. An example story may be found later in this specification. The steps represent the general design steps that may create a story that performs a specific action and consumes a data collection. In order to generate the data collection, definitions may be created for the data collected by a user, along with any transformation functions or analyses that may be performed to transform the collected data into the data transferred to the action.

The action may be defined in block 202. The action may be any routine, function, application, or other executable that may be called from the user interface. The action may be the final step when a user interface is presented, and the data collected from the user interface may be passed to the action.

In many embodiments, the action may represent the purpose or end goal of the user interface. For example, a user interface may assist a user in performing a specific task, such as changing a configuration on a device. The action may be a script or function call to the device with the desired settings for making the configuration change.

The data consumed by the action may be defined in block 204. Such data may be referred to as a data collection, and may represent various data objects that may be transferred to the action so that the action operates as intended.

The data collected from the user may be defined in block 206. The data collected by the user may not be the same as the data consumed by the action in some cases. In some cases, the user may supply data that may be transformed, processed, or analyzed to generate the data consumed by the action. In a simple example, an action may consume data in the form of a city and state. However, the information collected from the user may be a postal code. A transformation routine may convert the postal code received from the user to city and state consumed by the action.

Each information point collected from the user may be analyzed in block 208. For each information point in block 208, a data type may be defined in block 210.

The data type in block 210 may be used by a wizard engine to determine an appropriate user interface component to incorporate into a user interface. For example, a string type may be presented as an editable text box, or a real number type may be presented with a numerical input mechanism.

A user interface component may be an input mechanism presented on a user interface for presenting and capturing a specific data type. In many programming environments, several predefined user interface components may exist, and a wizard engine may select between the various user interface components to include in a user interface. In some embodiments, a user interface component may be defined in a user interface container. Such embodiments may include user interface components for complex data types corresponding to the complex data types defined in a story.

In some embodiments, the data type in block 210 may be a complex data type. A complex data type may be made up of primitive data types, such as strings, integers, real numbers, binary or Boolean, or other primitive data types. In some cases, complex data types may have corresponding user interface components. In other cases, a wizard engine may disassemble a complex data type to assign user interface components that can be used to collect and capture a complex data type.

Each data type may have a name assigned in block 212. In many cases, a wizard engine may use the name as a label for a user interface component. In other cases, various user interface hints may include labels, tags, or other information that may be presented to the user.

If the data type may not be directly consumed by the action in block 214, a transformation function may be defined in block 216. The transformation function may define how an input from a user may be transformed or changed to match the data collected by the user interface. For example, a transformation function may convert a telephone number received in one of several formats to a specific format used by an action.

In some embodiments, the transformation function may be defined using simple arithmetic, such as adding to figures together to create a third. In other embodiments, the transformation function may be quite complex and may be implemented by calling an external routine or function. In one such embodiment, a piece of data collected from a user may be transmitted to an external routine for lookup in a database. The value returned from the database may be placed in the data collection and consumed by the action.

Whether or not the transformation function is defined in block 216, validation criteria may be defined in block 218. In some embodiments, no validation criteria may be defined for certain data types. Validation criteria may define acceptable and unacceptable values of input data. In some cases, the criteria may be formatting related, such as requesting a five digit integer, while in other cases the criteria may be to accept certain values, such as to accept only valid five digit postal codes.

In some embodiments, the validation may be defined in a story. Such embodiments may be useful when the validation may be expressed simply. In other embodiments, the validation may be performed by a call to an external function. For example, a postal code may be sent to a remote server for validation against a database of valid postal codes.

Layout hints may be defined in block 220. A user interface hint may be any setting, definition, or other information that may be used by a wizard engine to modify the placement, function, look and feel, or other parameter with regard to the data item. For example, a layout hint may define that a certain data type may be displayed at the top of a page, or displayed with bold type. Other layout hints may define labels associated with the user interface component, or define help text or detailed descriptors that may be optionally displayed.

After processing each information point that may be collected in block 208, the information points may be organized into sections in block 222. The sections may be converted by the wizard engine into pages with some user interface containers. The pages may define groups of data types that may be collected together. In some embodiments, the pages may be defined with descriptive text, help text, images, or other information.

The sequence and branching of the sections may be defined in block 224. In some embodiments, the sequence of data collection may be defined to be in a special order, or may include branch points and conditions for certain sections. The sequencing and branching may allow a programmer to collect a data item from a user, then select different pages to show based on the data received from the user.

Each section may be evaluated in block 226. For each section in block 226, section layout hints may be defined in block 228. A section layout hint may operate similarly to a layout hint applied to a specific data type, but the section layout hint may define layout information that may be applied to the section as a whole. Section layout hints may define how an entire section may be presented, or how groups of data items may be laid out or organized visually.

For each section, a transition may be defined to another section in block 230. The transition may define visual transitions as well as data processing transitions. A visual transition may define how an animated change between one section and another, or may define a barrier or junction between two sections, for example. A data processing transition may define a function that may be performed to analyze and transform data, once the data items in a section are populated and when a user moves to the next section. Such functions may be defined in the story, and may include a call to an external function.

In some embodiments, a set of story layout hints may be defined in block 232. Story layout hints may define various layout parameters that may apply to the entire story. In some cases, the layout parameters may define, for example, which user interface containers are appropriate for the particular story, or certain look and feel options that may be applied to the entire story. In some cases, the story layout hints may define a set of validation settings that apply to all parameters in the story, or for other settings that may be applied across many data items or sections of the story.

Once the story is defined, the story may be stored in block 234.

Figure 3:
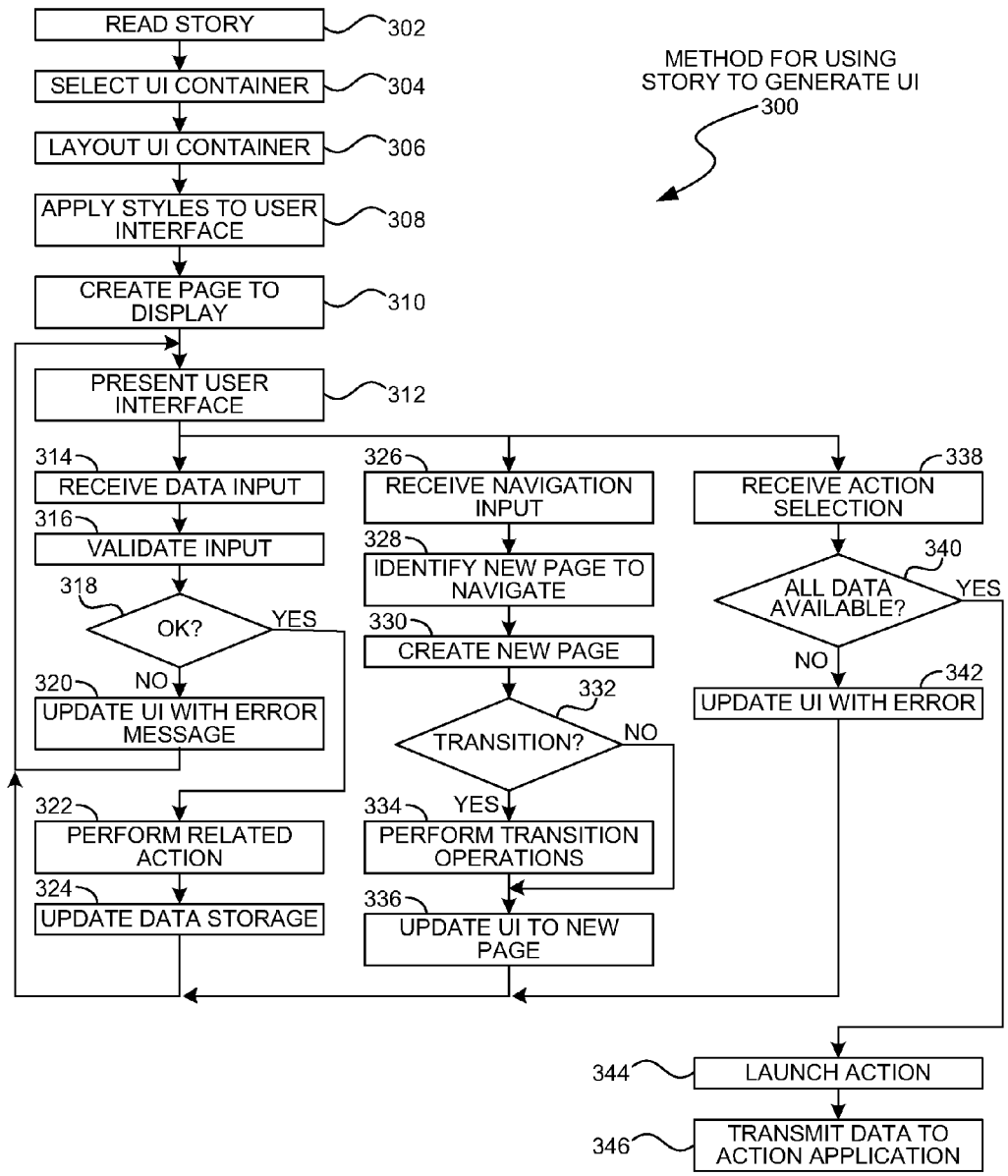
FIG. 3 is a flowchart illustration of an embodiment showing a method for generating and operating a user interface.

FIG. 3 is a flowchart illustration of an embodiment 300 showing a method for creating and operating a user interface based on a story. The process of embodiment 300 is a simplified example of how a wizard engine may consume a story to generate and operate a user interface.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is a simplified example of creating and operating a user interface based on a story. In block 302, the story may be read. In many cases, the story may be defined using XML or other declarative language.

A user interface container may be selected in block 304. In many cases, a particular story may be used with several different user interface containers. The selection of a specific user interface container may be aided by an application that provides the story to a wizard engine. For example, a conventional wizard user interface container may be selected when a user first attempts to perform a function or when little data are preexisting. When a user performs a function for a second time or when much of the data for executing an action preexists, an application may select a property sheet user interface container.

In some embodiments, a story may contain a list of user interface containers for which the story is designed. The list may be used by the wizard engine to select an appropriate user interface container.

In other embodiments, a wizard engine may analyze a story to determine the data types collected and general arrangement of the story, then select an appropriate user interface container that matches the characteristics of the story. Such characteristics may include matching the number of sections with a user interface container supporting the number of sections, or matching the data types, layout hints, or other items in the story with those of a user interface container.

The user interface container may be laid out in block 306. In many embodiments, the user interface container may contain various layout and operational characteristics of the user interface. In performing the layout of block 306, a wizard engine may determine the output characteristics of a user interface device, such as the screen width, resolution, and various other settings. These output characteristics may be used to layout the user interface.

The styles may be applied to the user interface in block 308. The styles may define various styles of text, images, and other items in a user interface. The styles may use Cascading Style Sheet (CSS) or other similar technologies to apply styles that may be assigned to various components.

In block 310, a page may be created to display. In many embodiments, a user interface may have several pages within a single display. For example, a wizard user interface may have several pages that are presented in succession or a property sheet user interface may have several pages that are accessed through tabs in a user interface.

In some embodiments, a wizard engine may create each page as requested by the user. For example, when a user completes one page of a wizard, the wizard engine may create the next page. In some embodiments, a wizard engine may create all of the pages of a user interface prior to presenting the first page to the user.

The user interface may be presented to the user in block 312. The user interface may be an interactive user interface that may contain several pages. Within the user interface, several navigation options may be available to the user. For example, some user interfaces may include tabs, breadcrumbs, tables of contents, or other navigation aids that may allow the user to browse to different sections of the user interface. Some user interfaces may have navigation buttons that advance or return from one page to the next.

In general, a user interface may allow a user to perform three general classes of actions: input data, navigate, or launch the action associated with the user interface.

User input may be received in block 314. When a validation is defined for a data type, the validation may occur in block 316. If the validation fails in block 318, the user interface may be updated with an error message in block 320 and the process may return to block 312. If the data passes validation in block 318, any actions related to the data may be performed in block 322 and the data may be stored in block 324.

The actions performed in block 322 may be any actions that may be linked to the data. For example, the actions in block 322 may include querying a database to collect related data that may be displayed on another page of the user interface or collected for transmission to an action.

A navigation input may be received in block 326. The navigation input may be from any type of navigation object within the user interface. In a classic wizard-type user interface, the navigation buttons may advance or go back within the sequence of user interface pages. In a property sheet style user interface, a user may be able to navigate by selecting any tab, for example. Some embodiments may have several ways a user may navigate through the user interface.

The new page to display may be identified in block 328. In embodiments where all of the pages are not previously created, the page may be created in block 330.

When a transition is defined for the page in block 332, the transition may be performed in block 334. The user interface may be updated to reflect the new page in block 336 and the process may return to block 312.

An action request may be received in block 338. In some embodiments, the action request may be in response to a selection by a user to launch the action. In other embodiments, the action request may be made automatically when all of the data items for the action have been populated.

If an action request is received and all of the data are not available in block 340, the user interface may be updated with an error in block 342. If the all of the data are available in block 340, the action may be launched in block 344 and the data collection may be transmitted to the action in block 346. In many embodiments, once the action is launched, the user interface may be removed.

Figure 5:
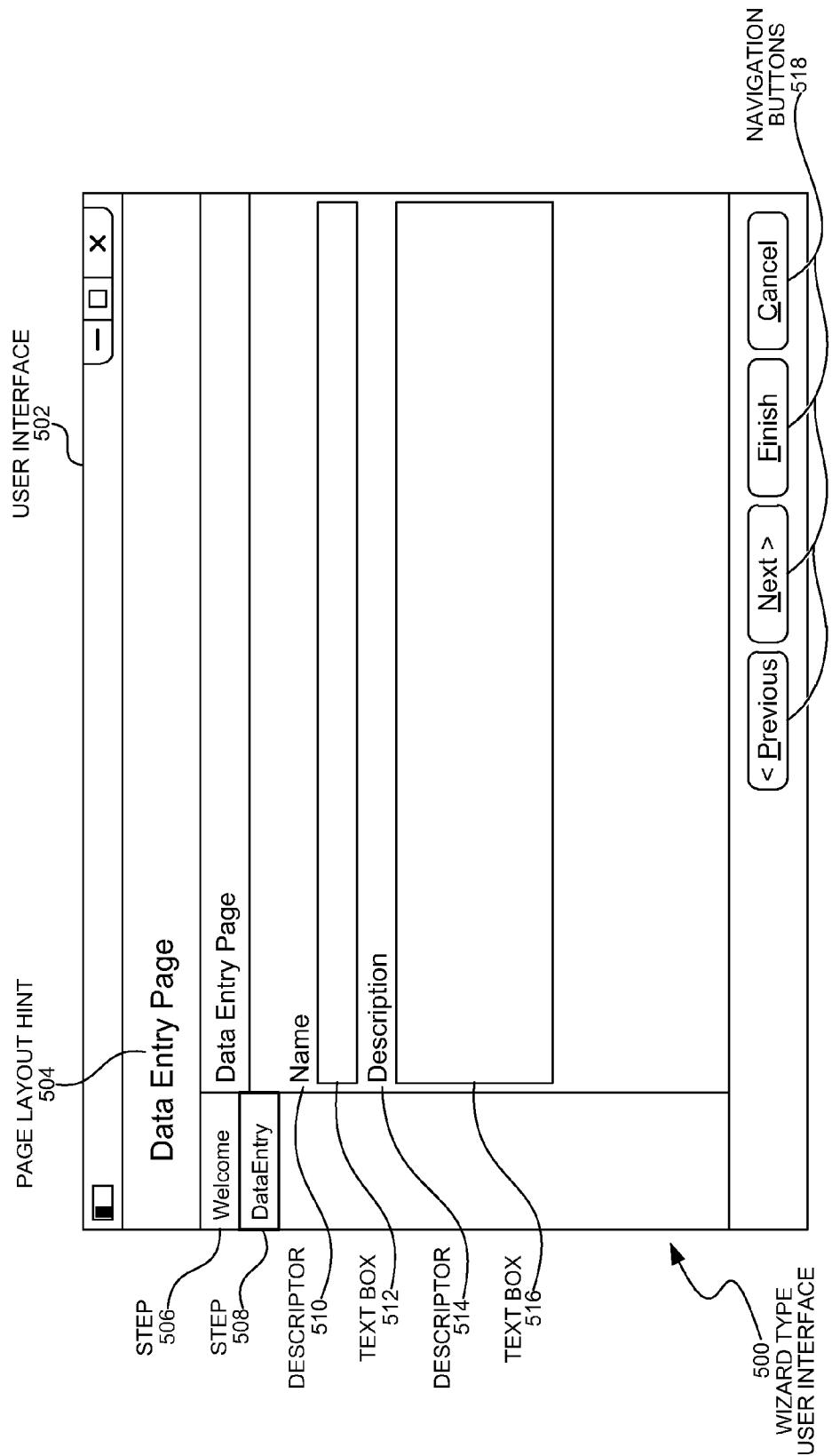
FIG. 5 is an example embodiment showing a wizard-style user interface generated from the example story.
Figure 6:
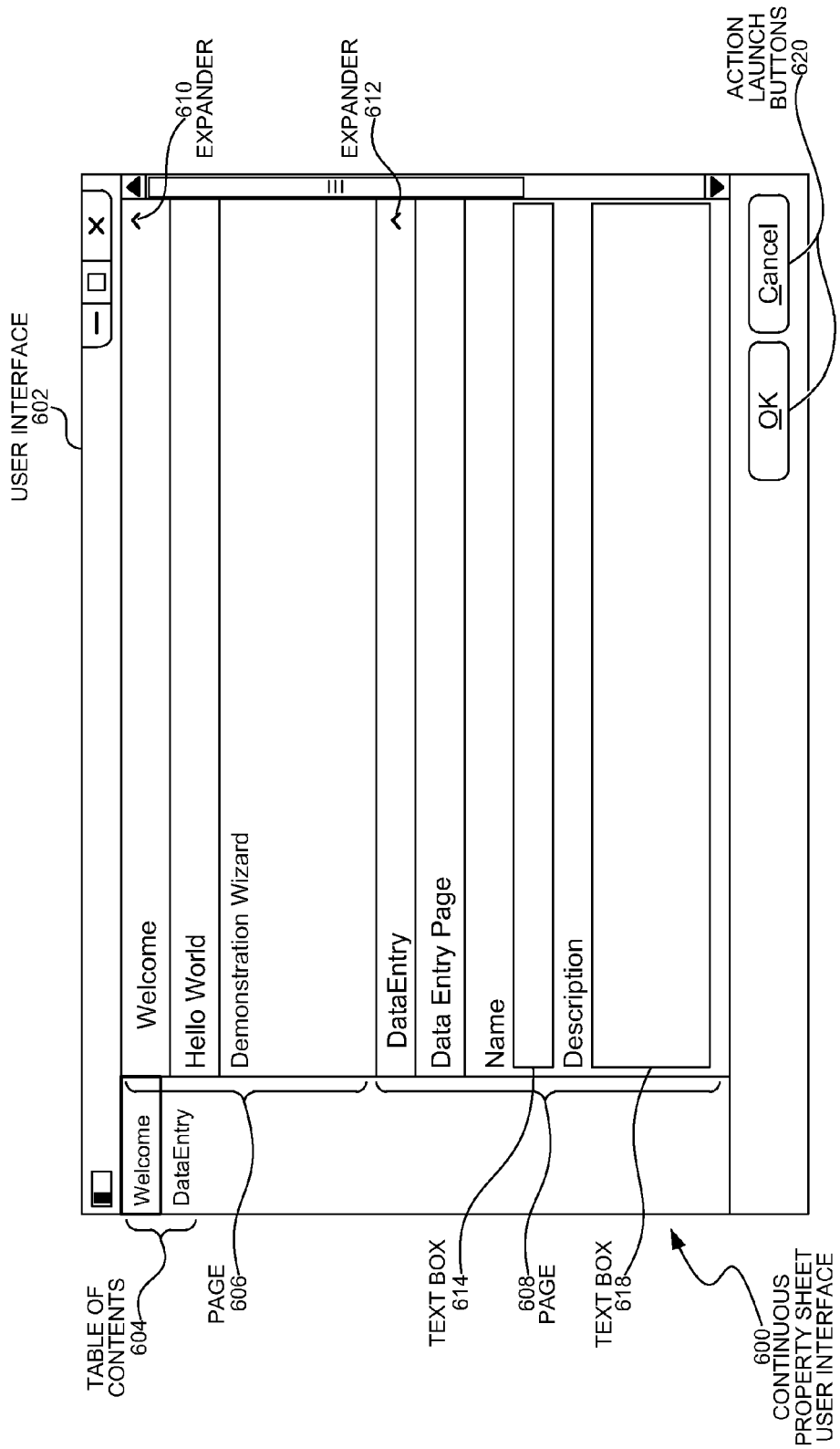
FIG. 6 is an example embodiment showing a continuous property sheet-style user interface generated from the example story.
Figure 7:
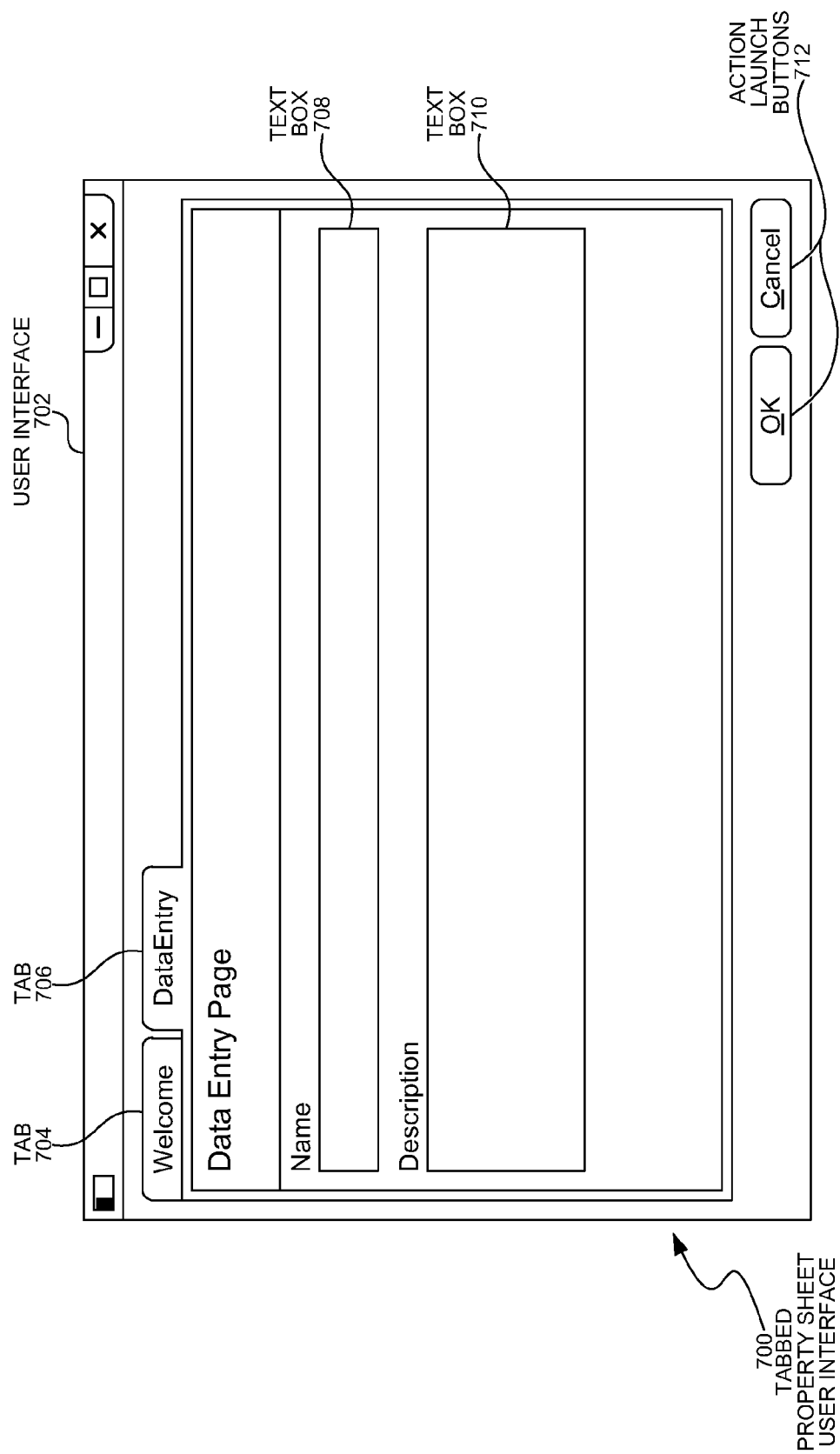
FIG. 7 is an example embodiment showing a tabbed property sheet-style user interface generated from the example story.

FIGS. 4-7 illustrate a simple example of a story and the various user interfaces that may be created from the story. FIG. 4 is an example story written in XML. FIG. 5 illustrates an embodiment of a wizard-style user interface created from the story of FIG. 4. FIGS. 6 and 7 illustrate embodiments of property sheet-style user interfaces showing a continuous property sheet and a tabbed property sheet, respectively.

FIG. 4 is an example embodiment showing an XML definition of a story that may be used to create several different user interfaces. Embodiment 400 contains a data collection 402 that includes two different properties, "Name" and "Description".

The two properties are collected from the user interface and used to launch an action 404. The action is to call "MyWizardAction" from an assembly entitled "MyActionsAssembly".

The story contains two sections 406 and 408. Section 406 is an introductory page and does not contain any user input. Section 408 defines two data items 408 and 410, which are "Name" and "Description", respectively. For item 408, the definition include a property "IsRequired=True", which indicates that the user is required to complete item 408 for this user interface. The definition further includes a validation definition that defines a minimum and maximum length of 1 and 256, respectively.

Item 410 does not have the "IsRequired=True" statement, indicating that item 410 is optional. The validation of item 410 is merely that it does not exceed 1024 characters. Item 410 also includes a layout hint in the form of a "Property.LayoutOverrides Height=300" statement. This statement gives a recommended height for any user input component, such as a text box, that the wizard engine may assign for the item.

Section 408 further contains a page layout hint 412 which includes a title for the page.

FIG. 5 illustrates an embodiment 500 showing a user interface 502 generated from the story of FIG. 4. Embodiment 500 is an example of a wizard-style user interface. A 'wizard-style' user interface may have several pages that are presented to a user in a predefined sequence.

The user interface 502 contains a title 504 that is an artifact of a page layout hint 412 defined embodiment 400. The user interface 502 shows two steps 506 and 508, corresponding to the sections 406 and 408 of embodiment 400. The step 508 is illustrated, showing the descriptor 510 and text box 512, as well as the descriptor 514 and text box 516. The descriptors 510 and 514 correspond to the data items 408 and 410.

The wizard style user interface of embodiment 500 shows the steps 506 and 508 on the left hand column In some embodiments, the steps 506 and 508 may be active controls that may allow the user to return to step 506 by clicking on the "Welcome" item.

The wizard style user interface may also contain a set of navigation buttons 518. The navigation buttons 518 may be the mechanism by which a user progresses through the sequence of a wizard.

The user interface of embodiment 500 represents a very rich and complex user interface having navigation features, layout, and a look and feel that may all be defined in default values within a wizard engine, or values defined within a user interface container or set of styles. The programmer merely defines the data to be collected, an action to perform, and data passed to the action, and the wizard engine may create a sophisticated, interactive user experience without any further programming.

FIG. 6 is an example embodiment 600 showing a user interface 602 that represents a continuous property sheet style user interface. Embodiment 600 is a second example of a user interface that may be created from the story of embodiment 400. The differences between embodiment 600 and embodiment 500 may be the differences in the user interface containers used to create the user interfaces.

User interface 602 is an example of a continuous property sheet style user interface. A property sheet style user interface may allow access to all of the properties displayed in the user interface, in contrast to a wizard style user interface where a user is presented with different pages in sequence. In a property sheet style user interface, the user may browse through different pages or portions of the user interface, editing or filling data as the user pleases.

In a continuous property sheet style user interface, each of the 'pages' of the user interface may be displayed in a large window. The user interface 602 has a table of contents 604 which may contain references to each of the 'pages'. In some embodiments, the table of contents 604 may be active navigation buttons, which may scroll the user interface to a selected page when clicked.

Each of the pages 606 and 608 are displayed with expanders 610 and 612, respectively. The expanders 610 and 612 may toggle to expand or collapse the respective page.

As with the embodiment 500, text boxes 614 and 618 are illustrated, representing the data items 408 and 410, respectively.

The user interface 602 may contain a set of action launch buttons 620, which are different from the navigation buttons 518 of embodiment 500. In a property sheet style user interface, a user may select the 'OK' action launch button 620 to cause the action to be performed. In such embodiments, the user interface may check to see if all of the data has been collected when launching the action.

In a wizard style user interface, the navigation buttons may allow the user to launch the action after the last page has been processed by the user.

FIG. 7 is an example embodiment 700 showing a user interface 702 that represents a tabbed property sheet style user interface. Embodiment 700 is a third example of a user interface that may be created from the story of embodiment 400. The differences between embodiments 700, 600, and 500 may be the differences in the user interface containers used to create the user interfaces.

The user interface 702 represents a second type of property sheet style user interfaces. In contrast to the continuous property sheet style user interface of embodiment 600, embodiment 700 has each page separated and accessible through tabs 704 and 706. Embodiment 700 is illustrated with tab 706 selected, which corresponds with the page 608 of embodiment 600, the configuration of embodiment 500, and the section 406 of embodiment 400.

As with the other embodiments, the user interface 702 includes the text boxes 708 and 710.

Embodiment 700 also includes a set of action launch buttons 712 that correspond with the action launch buttons 620 of embodiment 600.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
a processor;
a wizard engine, said wizard engine configured to:
  read a user-created declarative story,
  said user-created story comprising:
    an action to perform defined by the user,
    a data collection object, said data collection object defining a data type and a name for each of one or more data items associated with said action to be performed defined by the user, and
    at least one section for defining user interface instructions for presenting a user input component for each of said one or more data items,
      wherein user input for said one or more data items is for use in an action to be performed defined by the user;
  generate a user interface from said user-created declarative story,
    said user interface presenting said user input component for each of said one or more data items based on corresponding data type,
      wherein each user input component is used for collecting user input for a corresponding data item;
present said user interface to a user;
for each of said one or more data items, collect said user input for said data item through said corresponding user input component from said user;
populate said data collection object with collected user input for said one or more data items;
cause said action to be performed based on said populated data collection object; and
modify said user interface based on one or more of: a data item layout hint, a section item layout hint, and a story layout hint.

2. The system of claim 1, wherein said wizard engine configured to generate a user interface from said user-created declarative story comprise generating a multi-page user interface with a plurality of user-interface pages and wherein said wizard engine displays several pages that are presented to a user in a predefined sequence.

3. The system of claim 2, said story further comprising:
a transition definition between a first user interface page and a second user interface page, said first and second user interface pages included in said plurality of user-interface pages.

4. The system of claim 3, said story further comprising:
at least one conditional branch in said sequence.

5. The system of claim 2, wherein said wizard engine being configured to generate a user interface from said user-created declarative story comprises said wizard engine being configured to:
read a user interface container comprising layout information for said user interface; and
use said user interface container to create said user interface.

6. The system of claim 5, wherein said wizard engine being configured to generate a user interface from said user-created declarative story comprises said wizard engine being configured to:
   read a style sheet comprising style definitions; and
   use said style sheet to create said user interface.

7. The system of claim 6, said user interface container defining a wizard user interface.

8. The system of claim 6, said user interface container defining a property sheet user interface.

9. The system of claim 8, said property sheet user interface comprising tabs associated with each of said plurality of user interface sections.

10. The system of claim 5, wherein said wizard engine being configured to read a user interface container definition comprises said wizard engine being configured to select between a plurality of user interface containers to select said user interface container.

11. The system of claim 10, wherein said wizard engine being configured to read a user-created declarative story comprises said wizard engine being configured to read a user-created declarative story that includes one or more of: a data item layout hint, a section item layout hint, and a story layout hint.

12. A method comprising:
   processor;
   a wizard engine reading a user-created declarative story, said user-created story comprising:
      an action to perform defined by the user,
      a data collection object, said data collection object defining a data type and a name for each of one or more data items associated with said action to be performed defined by the user, and
      at least one section for defining user interface instructions for presenting a user input component for each of said one or more data items,
         wherein user input for said one or more data items is for use in an action to be performed defined by the user;
   generating a user interface from said user-created declarative story,
      said user interface presenting said user input component for each of said one or more data items based on corresponding data type,
         wherein each user input component is used for collecting user input for a corresponding data item;
   presenting said user interface to a user;
   for each of said one or more data items, collecting said user input for said data item through said corresponding user input component from said user;
   populating said data collection object with data from said collected user input for said one or more data items;
   causing said action to be performed based on said populated data collection object; and
   modifying said user interface based on said one or more of: a data item layout hint, a section item layout hint, and a story layout hint.

13. The method of claim 12, wherein generating a user interface from said user-created declarative story comprises applying one or more styles to said user interface.

14. The method of claim 13 further comprising:
   transforming said collected user input for said one or more data items into said derived data.

15. The method of claim 14, wherein generating a user interface from said user-created declarative story comprises reading a user interface container comprising layout information for said user interface.

16. The method of claim 12, wherein reading a user-created declarative story comprises reading a user-created declarative story that includes one or more of: a data item layout hint, a section item layout hint, and a story layout hint.

17. A computer program product for use at a computer system, the computer program product including one or more computer storage devices having stored thereon computer-executable instructions that, when executed at a processor, cause the computer system to perform a method including the following:
   read a user-created declarative story, said user-created story comprising:
      an action to perform defined by the user,
      a data collection object, said data collection object defining a data type and a name for each of one or more data items associated with said action to be performed defined by the user, and
      at least one section for defining user interface instructions for presenting a user input component for each of said one or more data items,
         wherein user input for said one or more data items is for use in an action to be performed defined by the user;
   generate a user interface from said user-created declarative story,
      said user interface presenting said user input component for each of said one or more data items based on corresponding data type,
         wherein each user input component is used for collecting user input for a corresponding data item;
   present said user interface to a user;
   for each of said one or more data items, collect said user input for said data item through said corresponding user input component from said user;
   populate said data collection object with data from said collected user input for said one or more data items;
   cause said action to be performed based on said populated data collection object; and
   modifying said user interface based on said one or more of: a data item layout hint, a section item layout hint, and a story layout hint.

18. The system computer program product of claim 17, said user interface device computer system being attached to a second device and accessed over a network connection between said computer system and said second device.

19. The computer program product of claim 17, wherein computer-executable instructions that, when executed at a processor, cause the computer system to generate a user interface from said user-created declarative story comprise computer-executable instructions that, when executed, cause the computer system to apply a style template to said user interface.

* * * * *